(No Model.)
J. T. HASTINGS.
FISH HOOK.
No. 570,632. Patented Nov. 3, 1896.
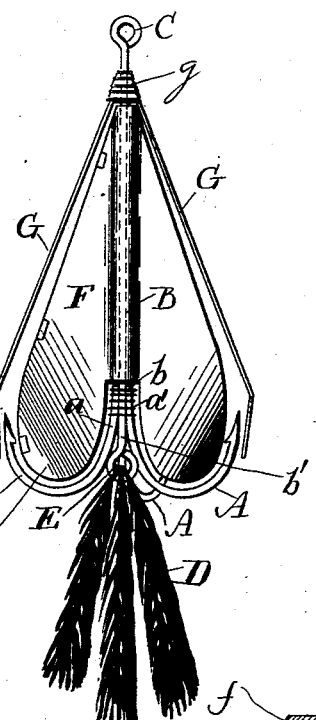
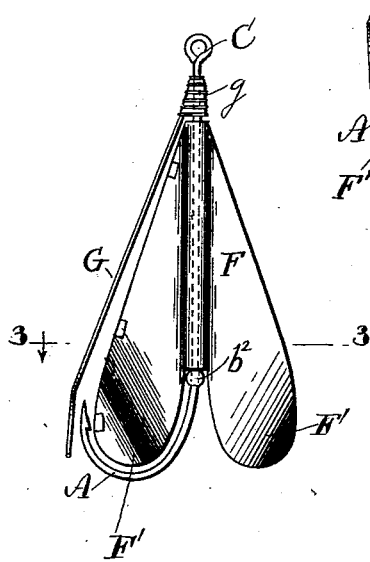
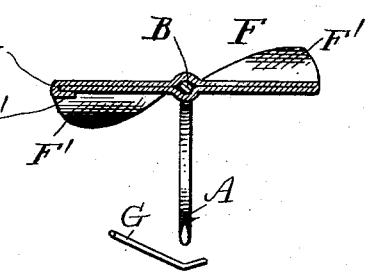
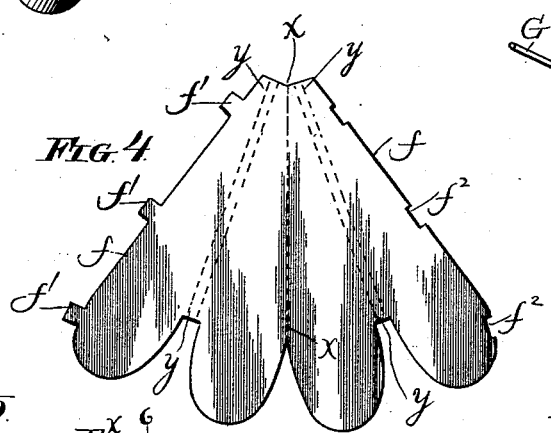
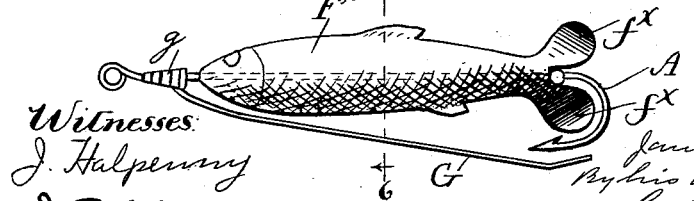
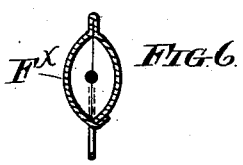
Witnesses:
J. Halpenny
S. T. S. Raron
Inventor:
James T. Hastings
By his attorneys
Craley & Hopkins
THE NORRIS PETERS CO., PHOTO-LITHO., WASHINGTON, D. C.

UNITED STATES PATENT OFFICE.

JAMES T. HASTINGS, OF CHICAGO, ILLINOIS, ASSIGNOR OF ONE-HALF TO CHARLES A. CRANE, OF SAME PLACE.

FISH-HOOK.

SPECIFICATION forming part of Letters Patent No. 570,632, dated November 3, 1896.

Application filed July 24, 1895. Serial No. 556,968. (No model.)

*To all whom it may concern:*

Be it known that I, JAMES T. HASTINGS, a citizen of the United States, residing at Chicago, in the county of Cook and State of Illinois, have invented certain new and useful Improvements in Artificial Bait for Fish-Hooks, of which the following is a specification.

The object of the present invention is to provide an artificial bait in the nature of a spinner which may be readily attached to or removed from the hook at will.

Heretofore all artificial baits of the spinner class have been permanently attached to the hook, so that when the hook is broken the bait is no longer of any use.

The object of this invention is to provide a bait that may be made and sold as a separate article of manufacture to be applied to and removed from hooks at will.

To this end the invention consists in the features of novelty that are particularly pointed out in the claims hereinafter; and in order that it may be fully understood I will describe it with reference to the accompanying drawings, which are made a part hereof, and in which—

Figures 1 and 2 are side elevations showing the bait in its preferred form, the only difference in the subjects-matter of the two figures being found in the construction of the hook. Fig. 3 is a transverse section thereof on the line 3 3, Fig. 2. Fig. 4 is a plan view of the blank from which the bait in its preferred form is made. Fig. 5 is an elevation of a bait differing somewhat from that shown in preceding figures and a hook to which it is applied. Fig. 6 is a section thereof in the line 6 6, Fig. 5.

In Fig. 1, A A A represent three hooks, each of which has a short stem $a$, extending only a little beyond its point, and all of which stems are secured at $a'$ to a common stem B. Preferably the stems $a$ are either soldered or brazed to the stem B, and in addition they are wrapped with fine wire, the joint being so shaped as to provide at $b$ an abrupt shoulder which forms a bearing for the spinner, as hereinafter fully described. The forward end of the stem B is provided with an eye C for receiving the line, and the stem has an extension $b'$, which projects beyond the joint $a'$ and is central with relation to the group of hooks, the object of this extension being to provide means for attaching the tuft D. For the more convenient attaching of this tuft the extension $b'$ terminates in an eye E.

The bait shown at F consists of a device which is mounted to turn or spin upon the stem of the hook and is so shaped and disposed that upon opposite sides of the stem and upon any given diametrical line the area of the bait or spinner is equally divided. I prefer to construct this bait of a single sheet-metal blank which, for a bait of the preferred form, is of the shape shown in Fig. 4. In any event the blank is folded upon itself upon a dotted line corresponding to the line X X, so that the parts of corresponding outline upon opposite sides of this dotted line will come together and form the bait.

For a bait of the preferred form the blank is also provided upon the dotted lines Y Y with two semicylindrical depressions which, when the blank is folded upon the dotted line X X, come together and form through the spinner from end to end a cylindrical socket or cavity for receiving the stem of the hook, the relative diameters of the said socket and stem being such that the bait is allowed perfect freedom of movement around the stem as an axis, while it is restrained from any considerable lateral movement. After the two halves of the blank are folded together, as described, their edges $f$ are detachably united by tongues $f'$, that project from one of them and are bent over the other, notches $f^2$ being provided for receiving them to the end that the edge of the bait, when completed, shall be without any irregularities or projections.

The bait is preferably made of sheet metal of such a degree of ductility that, when it is desired to do so, the tongues $f'$ may be bent back and the two halves of the spinner sprung apart far enough to remove it from or apply it to the stem of the hook.

The bait may be made and sold separate from the hook as an article of manufacture, or it may be sold with the hook and removed therefrom and applied to other hooks at will.

In Figs. 5 and 6 the bait is shown as being made in the form of a minnow $F^\times$, but even in this form it is made of a single sheet-metal blank folded longitudinally upon a central line and having flexible tongues for detachably securing together the edges that are remote from the line upon which it is folded. In all forms it is preferably given more or less of a spiral shape at one point or another, so as to cause it to spin as it is drawn through the water.

Having thus described my invention, the following is what I claim as new therein and desire to secure by Letters Patent:

1. As a new article of manufacture an artificial bait for fish-hooks, consisting of a single piece of sheet metal folded upon a central line extending through it longitudinally, the two halves upon opposite sides of said line being of corresponding shape and means for detachably uniting together the edges that are remote from the line upon which it is folded, substantially as set forth.

2. As a new article of manufacture an artificial bait for fish-hooks, consisting of a single piece of sheet metal folded upon a central line extending through it longitudinally, the two halves upon opposite sides of said line being of corresponding shape and flexible tongues proceeding from one and engaging the other of said halves, whereby their edges are detachably united, substantially as set forth.

3. As a new article of manufacture an artificial bait for fish-hooks, consisting of a single piece of sheet metal folded upon a central line passing through it longitudinally, the two halves upon opposite sides of said line being of corresponding shape and each of said halves being provided with a longitudinal depression, which depressions come together and form a socket and means for securing together the two halves, substantially as set forth.

JAMES T. HASTINGS.

Witnesses:
S. E. SHARON,
L. M. HOPKINS.